(12) United States Patent
Eck et al.

(10) Patent No.: US 8,016,099 B2
(45) Date of Patent: Sep. 13, 2011

(54) DEVICE FOR TRANSPORTING FREIGHT

(75) Inventors: Alexander Eck, Poppenhausen (DE); Markus Spinner, Igersheim (DE)

(73) Assignee: Wittenstein AG, Igersheim (DE)

( * ) Notice: Subject to any disclaimer, the term of this patent is extended or adjusted under 35 U.S.C. 154(b) by 20 days.

(21) Appl. No.: 12/442,470

(22) PCT Filed: May 9, 2008

(86) PCT No.: PCT/EP2008/003754
§ 371 (c)(1),
(2), (4) Date: May 21, 2009

(87) PCT Pub. No.: WO2008/141739
PCT Pub. Date: Nov. 27, 2008

(65) Prior Publication Data
US 2011/0000766 A1    Jan. 6, 2011

(30) Foreign Application Priority Data
May 21, 2007   (DE) .................. 10 2007 023 834

(51) Int. Cl.
*B65G 13/06*   (2006.01)
(52) U.S. Cl. .................. 198/788; 198/789; 198/782

(58) Field of Classification Search .................. 198/782, 198/780, 860.1, 788, 789; 193/35 SS
See application file for complete search history.

(56) References Cited

U.S. PATENT DOCUMENTS

| | | | | |
|---|---|---|---|---|
| 2,973,093 | A * | 2/1961 | Erickson | 198/789 |
| 3,698,539 | A | 10/1972 | Schwarzbeck | |
| 4,589,542 | A * | 5/1986 | Steadman | 198/782 |
| 4,823,927 | A * | 4/1989 | Jensen | 193/35 SS |
| 4,949,837 | A | 8/1990 | Huber | |
| 5,020,657 | A | 6/1991 | Huber | |
| 6,450,325 | B1 * | 9/2002 | Devnani | 198/788 |
| 2006/0291983 | A1 | 12/2006 | Konig et al. | |

FOREIGN PATENT DOCUMENTS

| | | |
|---|---|---|
| DE | 4102423 | 8/1991 |
| DE | 102005030058 | 1/2007 |
| EP | 0355251 | 2/1990 |

\* cited by examiner

*Primary Examiner* — James R Bidwell
(74) *Attorney, Agent, or Firm* — Bachman & LaPointe, P.C.

(57) ABSTRACT

A device for transporting freight, especially freight containers in the cargo compartments of aircraft, especially to a power drive unit (PDU) having a drive roller (3) received in a frame (1) wherein the at least one drive roller (3) carrying the drive roll (4) placed thereon is mounted so as to be pivoted relative to the frame for the purpose of replacing the drive roll (4).

5 Claims, 4 Drawing Sheets

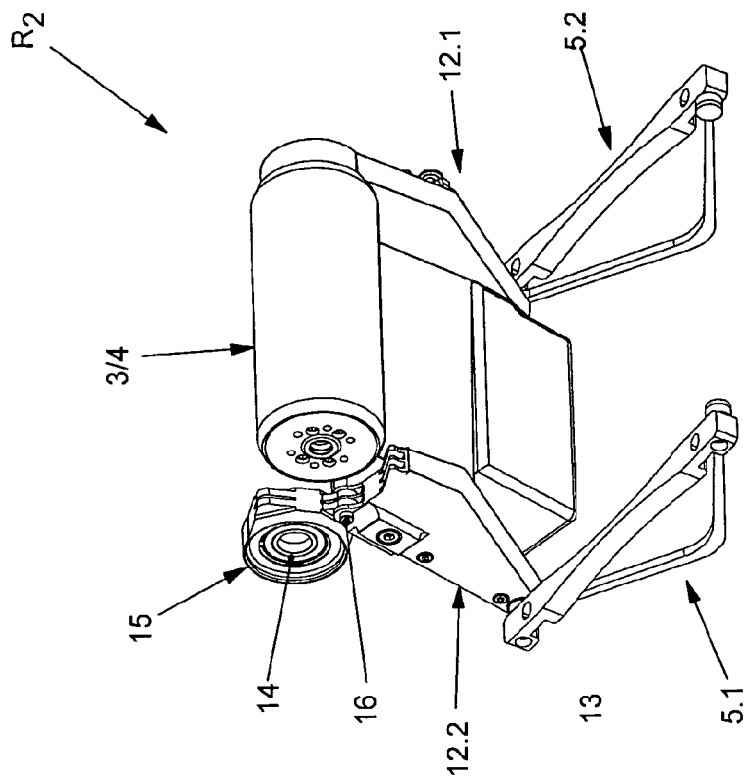
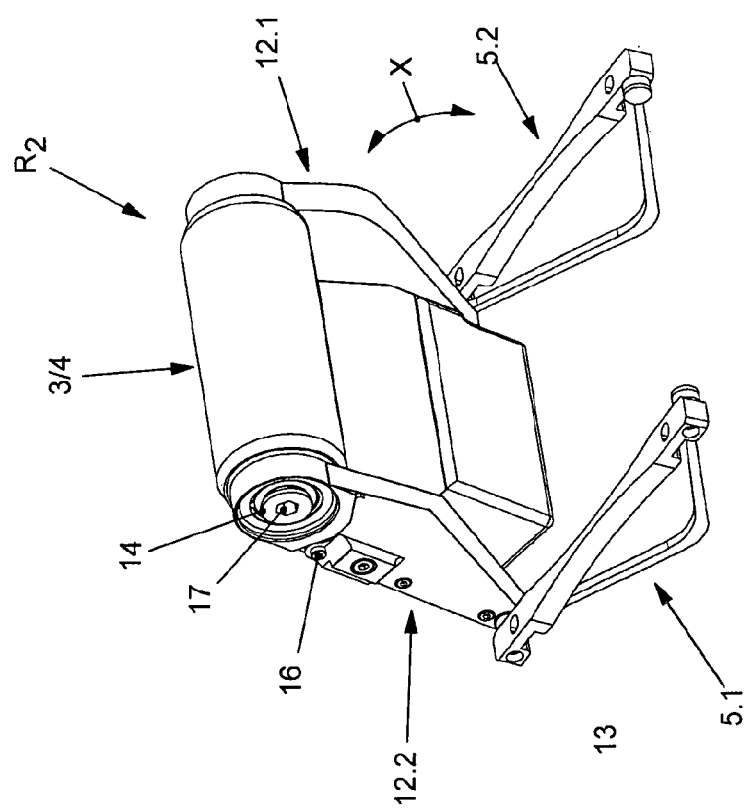

DEVICE FOR TRANSPORTING FREIGHT

BACKGROUND OF THE INVENTION

The present invention relates to a device for transporting freight, in particular freight containers in freight compartments of aircraft, in particular power drive unit (PDU) having a drive cylinder which is mounted in a frame.

Conventional devices for transporting freight are conventionally referred to as power drive units (PDU) and serve for actively and/or passively transporting freight containers in freight compartments of aircraft.

Such devices are not only subjected to intense demands during flight, since they must absorb very high loads, but rather must also operate reliably.

In particular, the drive roller of such device, in the case of an actively driven design, is subjected to a very high degree of wear, since said drive roller is provided on its outer surface and lateral surface with a coating, rubber lining or the like in order to transport the freight, in particular the freight containers, in a frictionally engaging manner.

Conventional PDUs have drive rollers, the drives of which must be dismounted in order to be able to remove the drive roller itself, which is undesirable.

Furthermore, no installation space is available for the drive unit, since the lateral bearing arrangements prevent simple disassembly.

It is an object of the present invention to provide a device of the type specified in the introduction which eliminates the stated disadvantages and in which the drive roller can be exchanged very quickly in a simple and cost-effective manner. Furthermore, the design should be cost-effective to produce. Furthermore, an integration of the drive into the drive roller should be possible while simultaneously enabling a fast change or exchange of the drive roller.

SUMMARY OF THE INVENTION

The object is achieved by providing a device wherein the drive roller is readily exchangeable.

In the present invention, it has proven to be particularly advantageous for the drive cylinder itself to be mounted so as to be pivotable, in particular swivelable or in an articulated fashion, with respect to a frame, in particular a lateral frame part.

A drive, in particular an electric motor, and/or a gearing unit is integrated in the drive cylinder itself.

Here, it is a particular advantage of the present invention that the drive roller can be plugged coaxially and in the manner of a sleeve onto the drive cylinder itself.

A bearing element is seated on the end of the drive roller which has the outer coating, casing, rubber lining or the like in order to transport the freight container in a frictionally engaging manner, which bearing element engages into a corresponding bearing depression or support of the opposite lateral frame part.

By correspondingly swiveling the unit composed of the drive cylinder and drive roller upward and outward, it is then possible for the drive roller to be pulled axially from the drive cylinder in order to exchange said drive roller for the purpose of repair or replacement.

In this way, it is necessary merely for the drive cylinder with the attached drive roller to be pivoted upward about a bearing arrangement of the lateral frame part. The corresponding drive roller can then be pulled off axially.

A repaired or new drive roller with a corresponding, possibly exchanged bearing element is then correspondingly pushed on in the reverse sequence in a very fast, time-saving and cost-saving manner, since this can even be carried out during operation of the aircraft.

This is likewise to be encompassed by the present invention.

In a further exemplary embodiment of the invention, it is possible for lateral auxiliary frames to be pivoted upward with respect to the frame itself, with a drive cylinder being fixedly connected at the end side to an auxiliary frame and being mounted there and with it being possible for a drive roller to be plugged on or pushed on coaxially in the manner of a sleeve at the other end at the end side in the above-described manner. Said drive roller is then mounted by means of corresponding auxiliary frames, with it being possible for a bearing receptacle with attached bearing element to be swiveled about a joint, in particular pivoted out of the end-side region, in order to axially pull the drive roller from the drive cylinder or push the drive roller onto the drive cylinder for the purpose of exchange and disassembly or assembly. It is possible here too for the drive roller to be removed from the drive cylinder or exchanged in a very fast, cost-effective and simple manner.

BRIEF DESCRIPTION OF THE DRAWINGS

Further advantages, features and details of the invention can be gathered from the following description of preferred exemplary embodiments and on the basis of the drawing; in which:

FIG. 2a shows a perspective side view of a further exemplary embodiment of a device for transporting freight, in particular PDU, in a deployed position;

FIG. 2b shows a perspective view of the device according to FIG. 2a in a further assembly position;

DETAILED DESCRIPTION

Figure 1A:
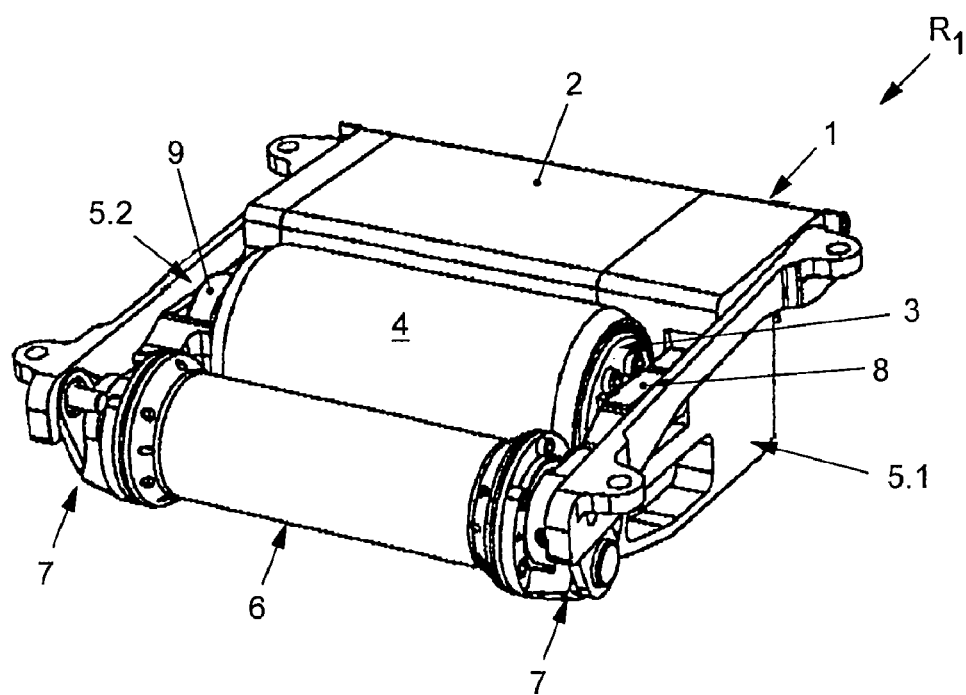
FIG. 1a shows a perspective view of a device for transporting freight, in particular PDU.

According to FIG. 1a, a device $R_1$ according to the invention for transporting freight, in particular freight containers in freight compartments of aircraft, which device is referred to in particular as a power drive unit (PDU), has a frame 1 which is formed in the manner of a housing.

Figure 1B:
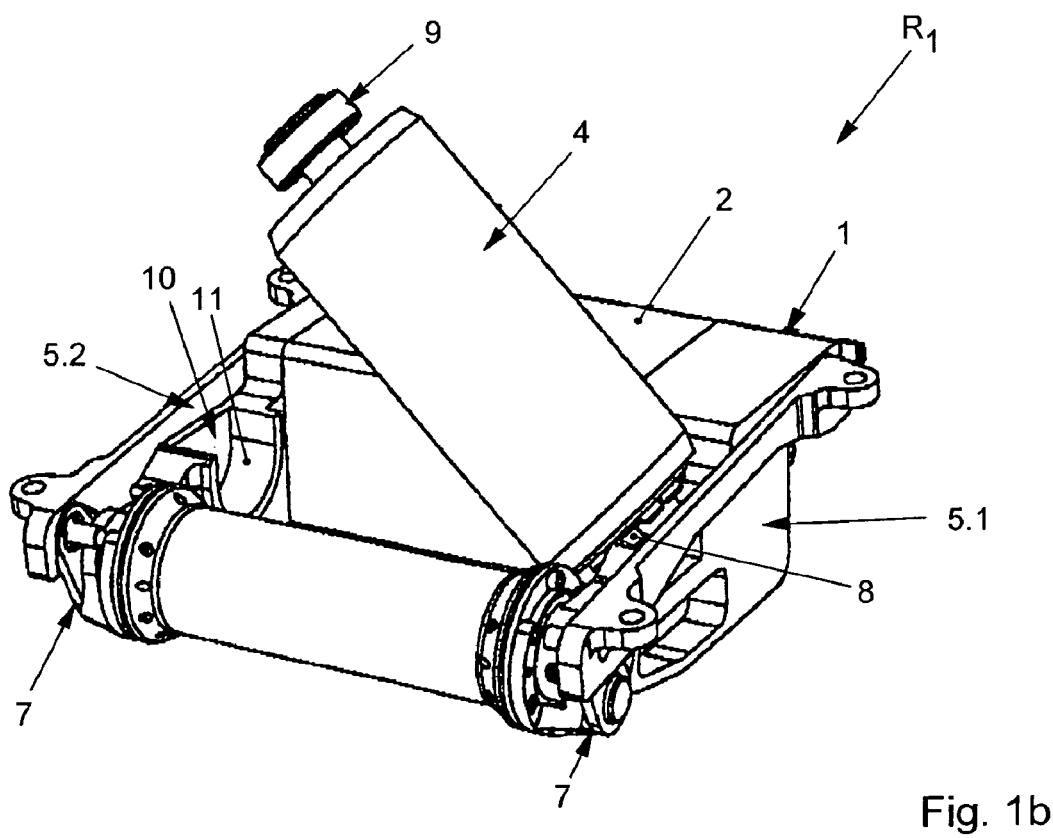
FIG. 1b shows a perspective view of the device according to FIG. 1a in a possible assembly position.
Figure 1C:
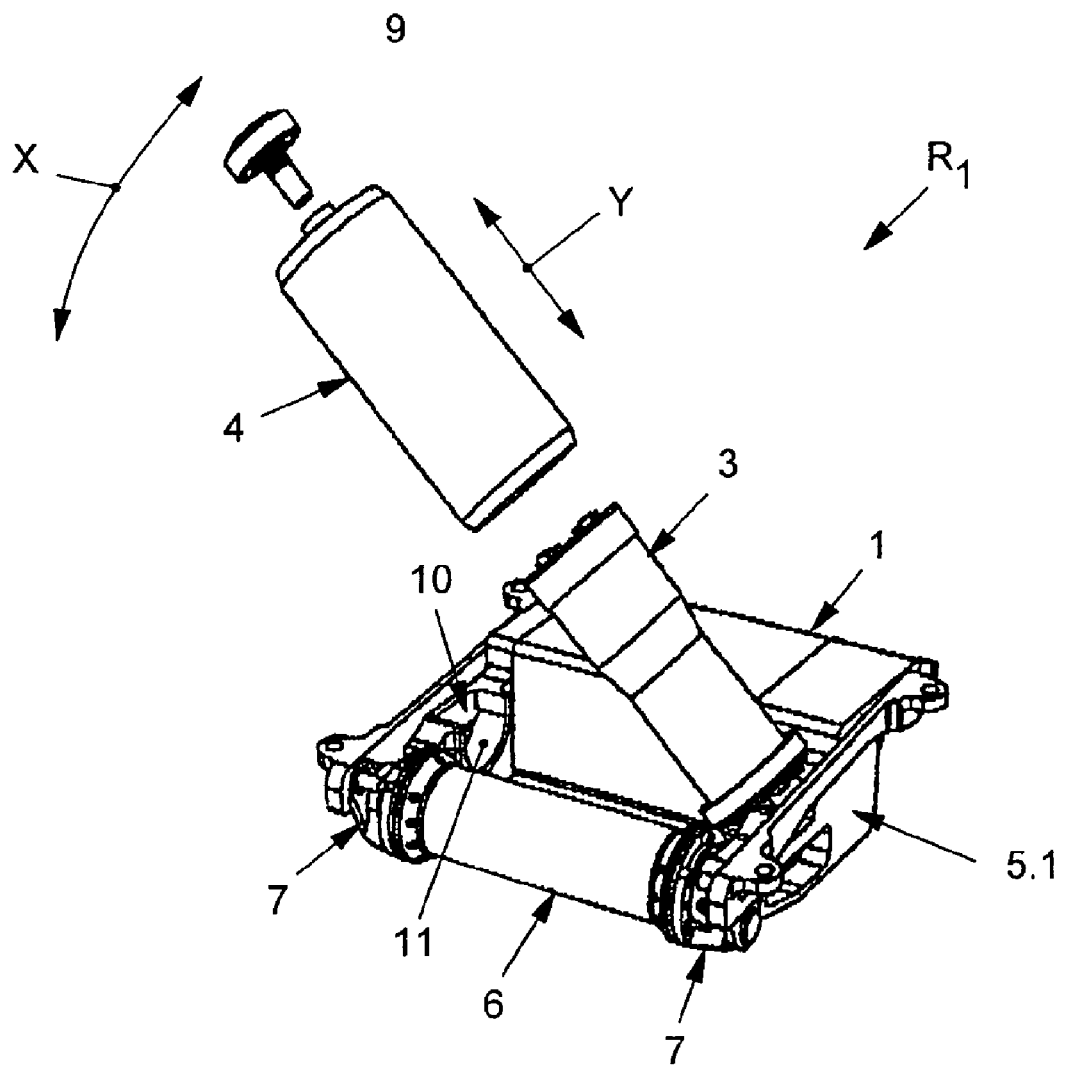
FIG. 1c shows a perspective view of the device according to FIGS. 1a and 1b in another assembly position.

A controller 2 for activating a drive cylinder 3 is integrated in the frame 1, as can be seen in more detail in FIG. 1c.

Drives, motor units and/or gearing units (not illustrated here in any more detail) are integrated in the drive cylinder 3 and drive a drive roller 4, which is seated coaxially on the drive cylinder 3, in rotation.

The drive roller 4 is of sleeve-like design and is provided on the outside with a coating, rubber lining or the like.

Here, the drive roller 4 can be connected in a rotationally fixed manner to the drive cylinder 3, such that a rotational drive movement of the drive cylinder 3 can be directly transmitted to the drive roller 4.

Lateral frame parts 5.1, 5.2 adjoin the frame 1, between which lateral frame parts 5.1, 5.2 the drive cylinder 3 with coaxially attached drive roller 4 is mounted.

Furthermore, a lifting unit 6 with an integrated drive (not illustrated here) adjoins the lateral frame parts 5.1, 5.2 at the ends, in order, by means of corresponding, in each case laterally projecting eccentrics 7, to deploy the frame 1, in particular the drive cylinder 3 and drive roller 4, upward in a known way in order to convey and transport an item of freight, in particular a freight container, by means of the driven drive roller 4.

The drive roller 4 and also the bearing element 9 thereof are subjected to a certain degree of wear, such that these must often be exchanged.

In order that the entire device $R_1$ need not be dismounted entirely from the aircraft, it has proven to be particularly advantageous in the present invention for the drive cylinder 3 with coaxially attached drive roller 4 to be mounted so as to be pivotable, in particular swivelable, with respect to the frame part 5.1.

Here, in the present invention, it is possible for the drive cylinder 3 with attached drive roller 4 to be pivoted upward and outward about a longitudinal axis of the frame part 5.1 by means of a bearing arrangement 8, as illustrated in FIGS. 1b and 1c by the double arrow X. The bearing element 9 adjoins the end of the drive roller 4, which bearing element 9 can be pivoted out of an upwardly-open bearing depression 10 of the frame part 5.2, which forms a half-shell-like support 11.

When acted on with pressure, for example by means of a freight container, the drive roller 4 as illustrated in FIG. 1a is mounted and held at one end by means of the bearing element 9 in the support 11 of the bearing depression 10 of the lateral frame part 5.2.

To exchange the drive roller 4, the latter can be pulled from the drive cylinder 3, after the latter has been swiveled out, in the illustrated Y direction as indicated in FIG. 1c, with an anti-twist device being released or removed if appropriate.

It is then possible, for example, to push a new drive roller 4 coaxially onto the drive cylinder 3, if appropriate with a new bearing element 9, in the axial direction. After the drive cylinder 3 and the drive roller 4 with bearing element 9 are correspondingly swiveled and placed into the bearing depression 10, the device $R_1$ is once again ready for use.

An exchange of the drive roller 4 takes place very quickly and may be carried out without dismounting the entire device $R_1$.

In the exemplary embodiment of the present invention according to FIG. 2a, a device $R_2$ is shown in which the frame is formed from lateral frame parts 5.1, 5.2, wherein in each case within a lateral frame part 5.1, 5.2, a lateral auxiliary frame 12.1, 12.2 can be pivoted upward and outward in an illustrated X direction.

Figure 2C:
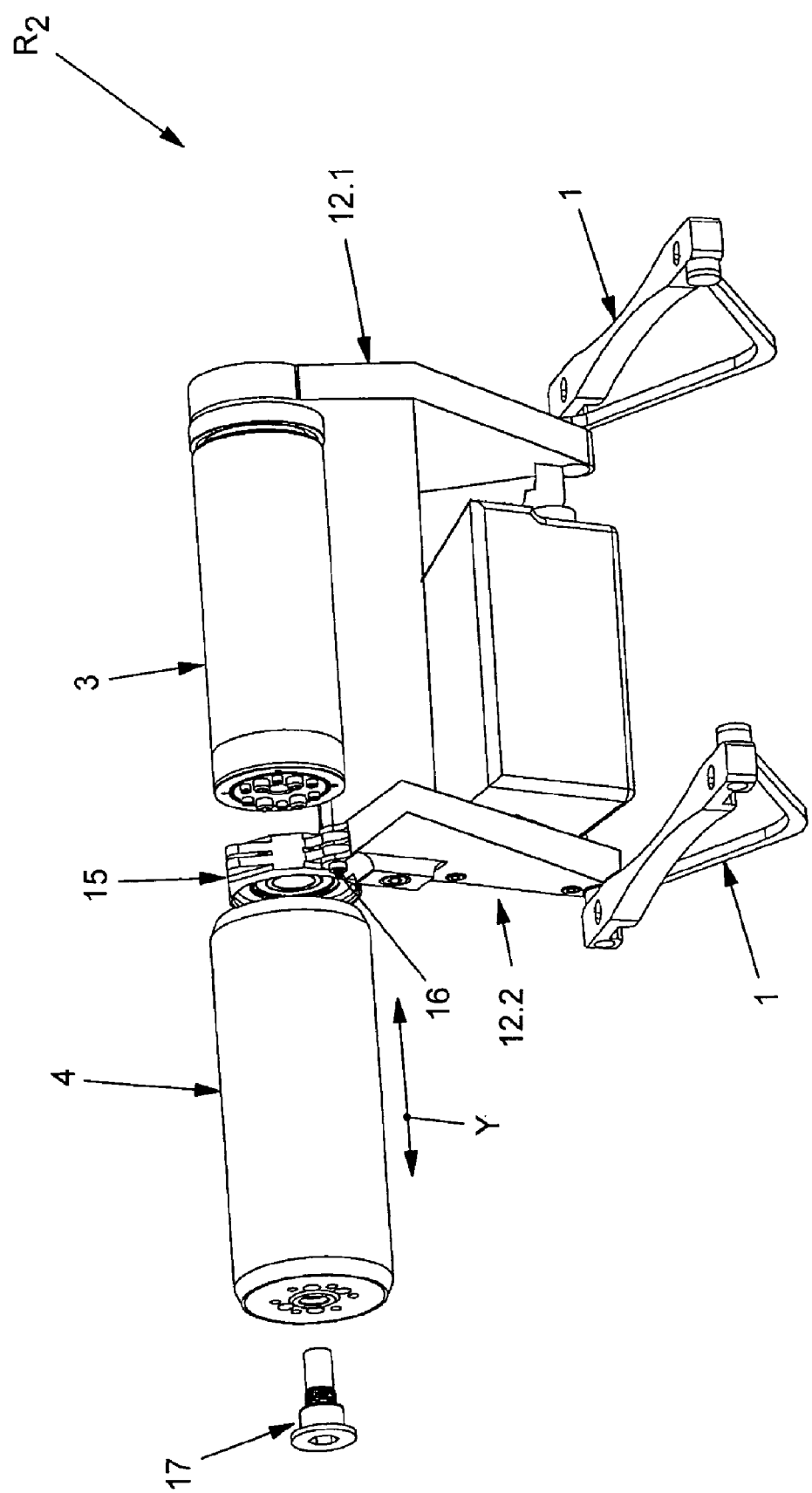
FIG. 2c shows a perspective view of the device according to FIGS. 2a and 2b in a further assembly position.

Here, in particular as is the design in the exemplary embodiment of the present invention according to FIG. 2c, the drive cylinder 3 with integrated electric drive, as a motor and/or gearing unit, is seated at the end side on the auxiliary frame 12.1.

The drive roller 4 is seated coaxially on the drive cylinder 3 in the above-described manner, and is preferably rotationally fixedly connected to the drive cylinder 3.

At the outside, the drive roller 4 is provided with a coating, rubber lining or the like, which comes into direct contact with an item of freight to be transported, in particular freight container.

The drive roller 4 is supported and mounted on the auxiliary frame 12.2 by means of a bearing element 14.

Here, in the present invention, it has proven to be particularly advantageous for a bearing receptacle 15 to be pivotable, in particular swivelable about a joint 16, out of the end-side region of the drive roller 4 after the removal of a retaining shaft 17.

As illustrated in FIG. 2c, it is possible, after the auxiliary frame 12.1, 12.2 has been swiveled out of the frame, for the retaining shaft 17 to be removed from the drive roller 4 and the bearing receptacle 15 or from the bearing element 14, after which it is possible for the bearing receptacle 15 with inserted bearing 14 to be subsequently swiveled away or pivoted out, as illustrated in FIG. 2b, in order to subsequently pull the drive roller 4 coaxially from the drive cylinder 3 in the direction of the auxiliary frame 12.2, in the illustrated double arrow direction Y, as per the exemplary embodiment according to FIG. 2c, for the purpose of exchange.

A new drive roller 4 can then be pushed coaxially onto the drive cylinder 3 again in the reverse sequence, after which merely the bearing receptacle 15 is subsequently pivoted back in front of the drive roller 4 at the end side and the drive roller 4 and/or the drive cylinder 3 are/is connected by means of the retaining shaft 17 to the auxiliary frame 12.2 and therefore to the bearing element 14 and the bearing receptacle 15 thereof.

Here, too, a very fast exchange of the drive roller 4 from the drive cylinder 3 takes place without it being necessary to completely exchange or dismount the device $R_2$.

The invention claimed is:

1. A device for transporting freight containers in freight compartments of aircraft, comprising: a power drive unit (PDU) having a drive cylinder (3) which is mounted in a frame (1), a drive cylinder (3) having a coaxially attached drive roller (4) pivotable out of a frame by means of an auxiliary frame (12.1, 12.2), the drive roller (4) engages the drive cylinder (3) and is rotationally fixedly connected to the drive cylinder (3) and is mounted at an end in the further lateral auxiliary frame (12.2), wherein, when the drive roller (4) is moved coaxially from the drive cylinder (3), a bearing receptacle (15) with bearing element (14) on the further lateral auxiliary frame (12.2) is pivotable and swivelable out of an axial region of the drive roller (4).

2. The device as claimed in claim 1, wherein the drive cylinder (3) is fixedly and rotatably mounted at one end on a first lateral auxiliary frame (12.1).

3. The device as claimed in claim 2, wherein the drive roller (4) is rotatably mounted at the end on a further lateral auxiliary frame (12.2).

4. The device as claimed in claim 1, wherein the drive cylinder (3) has an integrated unit composed of an electric drive.

5. The device as claimed in, claim 1 wherein the bearing receptacle (15) is swivelable about an eccentric joint (16).

* * * * *